United States Patent
Baum et al.

(10) Patent No.: US 6,836,461 B2
(45) Date of Patent: Dec. 28, 2004

(54) CLAMPING DEVICE FOR REMOVABLE DISKS

(75) Inventors: Dieter Baum, Wiesbaden (DE); Frank Krick, Ockenheim (DE); Ferdinand Rosskopf, Guldental (DE)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 10/097,947

(22) Filed: Mar. 14, 2002

(65) Prior Publication Data

US 2002/0141327 A1 Oct. 3, 2002

(30) Foreign Application Priority Data

Mar. 28, 2001 (EP) .......................................... 01107650

(51) Int. Cl.⁷ ........................ G11B 17/028; G11B 25/04
(52) U.S. Cl. .................................... 369/270; 360/99.12
(58) Field of Search .......................... 369/270.1, 271.1; 360/99.12, 99.05

(56) References Cited

U.S. PATENT DOCUMENTS

| | | | | | |
|---|---|---|---|---|---|
| 3,741,567 A | * | 6/1973 | Bis | ........................... | 369/270 |
| 3,871,663 A | * | 3/1975 | Stave | ......................... | 369/270 |
| 4,403,319 A | * | 9/1983 | Adamek et al. | ............ | 369/261 |
| 4,755,981 A | * | 7/1988 | Ekhoff | ......................... | 369/270 |
| 5,014,143 A | * | 5/1991 | Mori et al. | ............... | 360/99.12 |
| 5,025,340 A | * | 6/1991 | Peters | ...................... | 360/99.12 |
| 5,048,005 A | * | 9/1991 | Ekhoff | ......................... | 369/270 |
| 5,056,082 A | * | 10/1991 | Ekhoff | ......................... | 369/270 |
| 5,637,200 A | * | 6/1997 | Tsymberov | ............. | 204/298.15 |
| 5,644,564 A | * | 7/1997 | Peters | ......................... | 369/270 |
| 6,249,506 B1 | * | 6/2001 | Oowaki et al. | ............. | 369/271 |
| 6,272,104 B1 | * | 8/2001 | Liao et al. | ................... | 369/270 |

* cited by examiner

Primary Examiner—Angel Castro
(74) Attorney, Agent, or Firm—Robert B. Martin; Dillon & Yudell LLP

(57) ABSTRACT

A clamping device for clamping disks uses a flexible lock member, a hub, and a cap. The hub is mounted to a spindle, which defines a rotational axis for the hub. The upper portion of the hub has a recess including a guide in which the lock member is axially introduced. A clamping effect of the lock member in the recess is preferably achieved by selecting outer diameter of the lower portion of the lock member greater than the diameter of the cylindrical recess. The hub has a disk seating surface proximate to the base of the upper portion. The lock member is a unitary cap-shaped member made of flexible material, and preferably includes a plurality of axial fingers extending the disk-seating surface. The fingers are preferably a lower and an upper portion. The lower portion comprises an outer stiffening area forming a greater diameter than the upper portion.

16 Claims, 3 Drawing Sheets

CLAMPING DEVICE FOR REMOVABLE DISKS

This application claims the priority benefit of European Patent Application No. 01107650.2, filed on Mar. 28, 2001, and entitled "Clamping Device for Removable Disks."

BACKGROUND OF THE INVENTION

1. Technical Field

The present invention relates to clamping devices for supporting and releasing recording media disk, and in particular to spindle clamps for removably supporting a disk for rotation about an axis, where the disk has a central aperture.

2. Description of the Prior Art

Disks need to be tested after their manufacturing. Normally this will be done in so called test drives. Placement of disks on test drives involves three aspects: disk introduction, centering, and clamping. U.S. Pat. Nos. 4,755,981, 5,048,005, and 5,056,082 mainly address clamping of the disk in the test drive.

U.S. Pat. No. 4,755,981 discloses a clamp device in which fluid pressure actuates release of a disk and split jaws engage the aperture edge of the disk to clamp the disk in absence of fluid pressure. The clamp device comprises a hub which is rotatable about a central axis, an annular jaw split into a plurality of jaw pieces and disposed in a trough defined in the top end surface of the hub, a cap in contact with the jaw pieces with means for biasing the cap downward against the jaw pieces and means for applying fluid pressure to force the jaw pieces upward. A portion of the hub forms a central cone radially inward from the trough, the surface of the cone defining a wedge surface. O-ring springs are provided for biasing the jaw pieces inward into engagement with the wedge surface. In absence of fluid pressure, the cap forces the jaw pieces downwardly and the wedge surface forces the jaw pieces outwardly into engagement with the a disk. Fluid pressure is applied through passageways in the hub to a diaphragm in the bottom of the trough. The diaphragm bulges upwardly forcing the jaw pieces on the top of the diaphragm upwardly. The O-ring springs maintain the jaw pieces in engagement with the wedge surface, thereby forcing the jaw pieces inwardly, releasing the disk.

U.S. Pat. No. 5,048,005 discloses a clamping apparatus which includes the lock member and the hub. The hub is adapted to be mounted to a conventional spindle, which spindle defines a rotational axis for the hub. The hub has an axial frustroconically-shaped upper portion and a disk-seating surface proximate to the base of the upper portion. The lock member is a unitary, cup-shaped member made of an elastically flexible material and preferably includes a plurality of axially-arranged fingers. Pneumatic or mechanical actuation of a piston within the hub is translated to the lock member to cause movement from a disk-releasing position to a disk-clamping position. Downward movement of the piston draws the lower extremities of the fingers along the bearing surface of the hub until the lock member reaches the disk-clamping position in which the fingers press a data disk against the disk-seating surface of the hub. A spring is utilized to bias the lock member in the disk-clamping position.

U.S. Pat. No. 5,056,082 discloses a spindle clamp for removably supporting a data disk wherein the clamp has a spindle adapted for rotation about a vertical axis. The top of the spindle is stepped, having an inner raised surface, an intermediate gap-forming surface and an outer disk-seating surface. A segmented annular jaw assembly rests atop the raised surface and forms an annulus having an outer diameter less than the inside diameter of the data disk. The radially inward portion of the jaw assembly has an inverted and truncated conical bearing surface in frictional contact with a conforming wedge surface of a cam member. Downward displacement of the cam member causes the wedge surface to move the individual segments of the jaw assembly in a radially outward direction. The cam member is moved pneumatically from a disk-releasing position to a lower disk-clamping position that positions the edges of the individual segments of the jaw assembly above the data disk. Simultaneously, the cam member contacts a portion of a load transfer member spatially situated between the cam member and the jaw assembly. Interaction of the cam member, the load transfer member and the jaw assembly forces the jaw assembly onto the upper surface of the data disk, thereby securing the data disk to the spindle.

The flexible lock member in both patents (U.S. Pat. Nos. 4,755,981, 5,048,005) having an axially-arranged conical aperture allowing gliding of the lock member over an axially conically-shaped upper portion arranged in the hub causing a movement from the disk-releasing position to a disk clamping position. As well as described in patent U.S. Pat. No. 5,056,082, a conical wedge surface of an axially arranged cam member is gliding into the conical bearing surface of the segmented annular jaw assembly.

Another disadvantage is, as described in patent U.S. Pat. Nos. 4,755,981 and 5,056,082, that the surface of the disk can be damaged because of radial sliding segments or a cup shaped member while clamping. The manufacturing of the conical aperture as well as the conically-shaped upper portion has to be made with high precision resulting in a high technical expenditure. Furthermore, the segmentation of the lock member is made with displaced arranged holes and cuts which are very costly and time consuming. Clamping of disks can be negatively effected by adversely arranged positions between the conically-shaped upper portion and the conical aperture of lock member resulting in negative effects with testing of disks. Finally, clamping is restricted to vertical usage only due to movably-arranged lock member.

It is therefore object of the present invention to provide a clamping device avoiding the disadvantages of the above mentioned prior art. This object has been solved by the features of the independent claims. Further preferred embodiments of the present invention are laid down in the dependent claims.

SUMMARY OF THE INVENTION

One embodiment of the present invention discloses a clamping device for clamping of disks. The clamping device comprises a flexible lock member, a hub in which the lock member is arranged and a cap. The hub is adapted to be mounted to a conventional spindle, which defines a rotational axis for the hub. The upper portion or middle portion of the hub having a recess including a guiding portion preferably cylindrical in axial direction in which the lock member has to be axially introduced. A clamping effect between lock member and recess is preferably achieved by selecting outer diameter of the lower portion of the lock member greater than the diameter of the cylindrical recess. Furthermore, the hub has a disk seating surface proximate to the base of the upper portion. The lock member is an unitary cap-shaped member made of elastically flexible material at least in its upper part and preferably includes a plurality of axially-arranged fingers. The fingers preferably comprises a lower and an upper portion. The lower portion comprises an outer stiffening area forming a greater diameter than the upper portion. The stiffening area involves two aspects—clamping of the lock member within the recess of the hub and avoiding bending of the axially-arranged fingers in their upper portion during the disk clamping position. The fingers at least in their upper portions are arranged in an inclined position providing a secure clamping effect. The outer border of the cap contacting the fingers is conically-shaped. Pneumatic or mechanical actuation of a piston within the hub is translated to the lock member to cause movement from a disk-releasing position to a disk-clamping position. Downward movement of the piston forces the conically-shaped outer border of the cap against the rounded outer fingers thereby causing an expansion of the outer fingers until the outer fingers reach a disk-clamping position in which the outer fingers press a disk against the disk-seating surface of the hub. A spring is utilized to bias the lock member in the disk-clamping position.

BRIEF DESCRIPTION OF THE DRAWINGS

In the following a preferred implementation of the present invention is described with reference to the drawings in which.

DETAILED DESCRIPTION OF THE PREFERRED EMBODIMENT

Figure 1B:
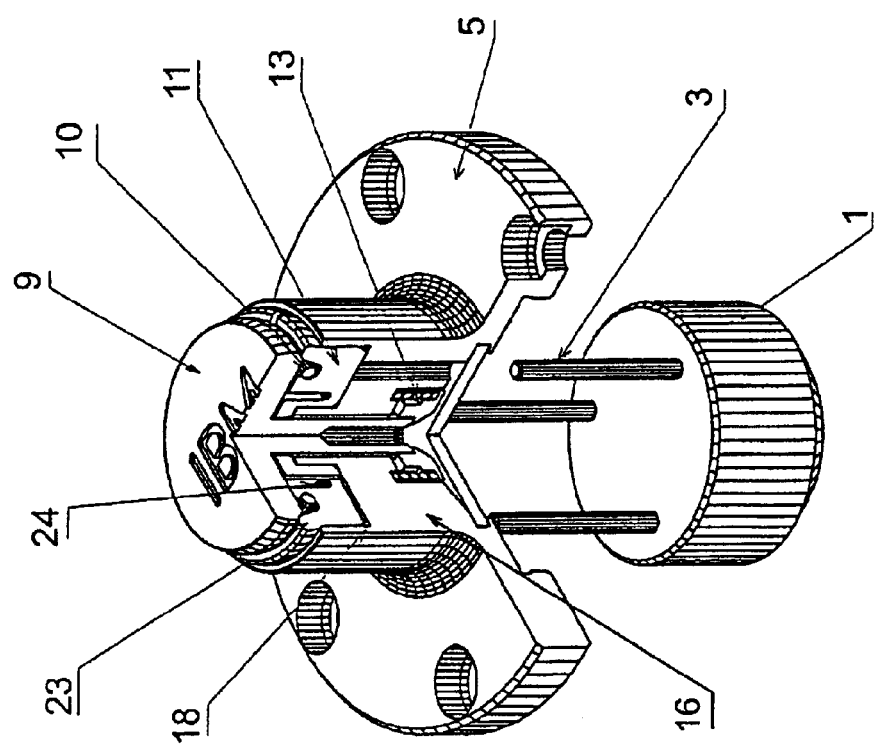
FIG. 1B is a perspective view of the clamping apparatus of FIG. 1A.
Figure 1A:
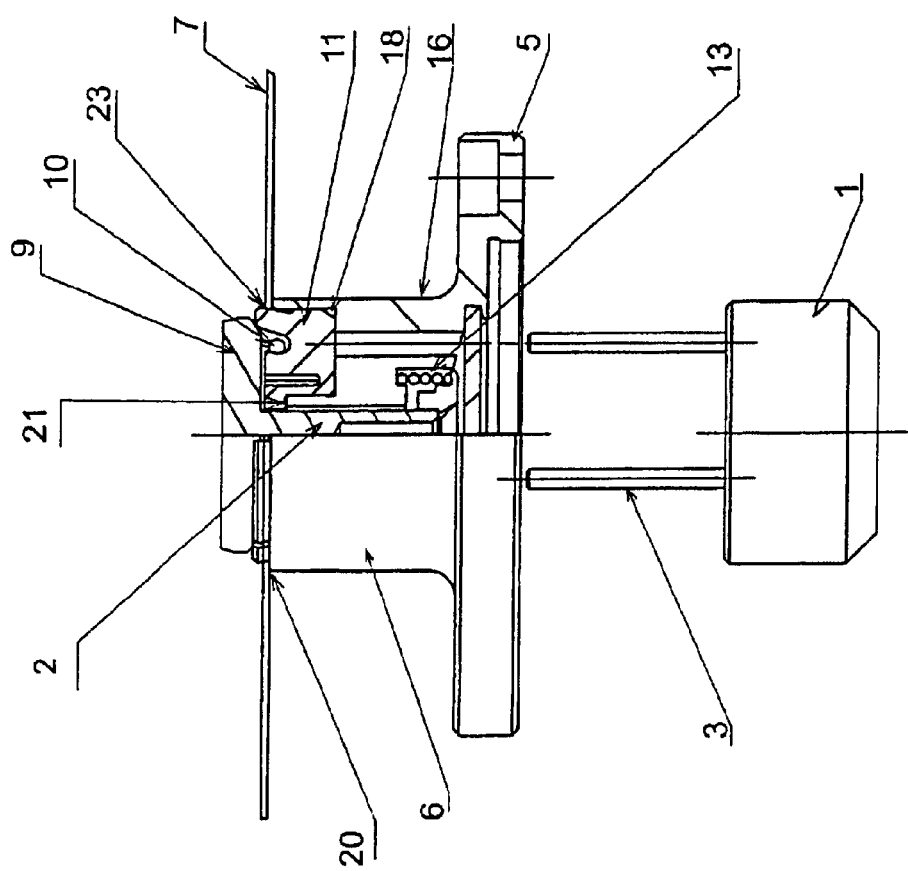
FIG. 1A is a sectional side view of the clamping apparatus of the present invention.

FIGS. 1A and 1B show the inventive clamping apparatus comprising a hub 5, a lock member 11, and cap 9 arranged at a piston 2. The hub 5 is mounted to a spindle shaft of a turnable for rotation of a central axis. Furthermore, the hub 5 having an upper portion 6 which defines at its upper end a disk-seating surface 20.

As best seen in FIG. 1A the upper portion 6 of the hub 5 includes an axially-arranged, cylindrical recess 18 for arranging the lock member 11 within the hub 5. Within the recess 18 an axial guiding member 21 is arranged allowing easy introducing of the lock member 11 into the recess 18 as well guidance for the piston 2 by an aperture within the guiding member 21. Preferably at the bottom surface of the recess 18 holes are arranged allowing removal of the lock member 11 by a special removal member 1 having pins 3.

The lock member 11 being made of an elastically flexible material having a plurality of axially arranged fingers 23 laterally expandable. Tn their relaxed position the fingers 23 form an outer diameter allowing introducing of a disk 7. In their clamped position the fingers 23 form an outer diameter allowing clamping of the disk against the disk-seating surface 20. The fingers 23 are spaced from adjacent fingers 23 by narrow slits. The slits are continuous from the upper portion to lower portion of the lock member 11. The piston 2 is free of contact with the locking member 11, Preferably the lock member 11 comprises two rows of fingers 23 extending in axial direction, one outer row which forms the outer fingers 23 of the lock member 11 supporting clamping effect and the inner row which forms the inner fingers 24 supporting retracting of the outer fingers 23 in their base or relaxed position by using a O-ring 10 arranged around the inner row. The inner fingers 24 and the outer row of fingers 23 are separated by a groove 25. Both rows of fingers 23, 24, the O-ring 10, and the groove 25 are all axially aligned with each other such that the O-ring 10 is located between both rows of fingers 23, 24 in an axial direction. Furthermore, the inner part of the inner row is hexagonally formed providing fixing positions for the inner fingers 24. In a preferred embodiment the fingers 24, 23 of the inner and outer row are radially assigned to each other. Each radially assigned pair of the inner and outer fingers 23, 24 has a common bending area (hinge effect). The fingers of the outer row having a contacting surface with the cap are greater than the fingers of the inner row.

The hexagonal part of the lock member 11 contains an axially arranged aperture providing guidance for the piston 2. Preferably the lower portion of the lock member, preferably the outer area of the outer fingers of the lower portion comprises a stiffening area 38 forming a greater diameter than the upper portion, such that the lower portion 38 of the lock member 11 remains in contact with the cylindrical recess 18 while expanded and retracted. The stiffening area involves two aspects—clamping of the lock member within the recess 18 of the hub 5 and avoiding a bending of the axially-arranged fingers 23 during the disk clamping position. Preferably, the outer fingers 23 having contacting surface with the cap 9 are rounded.

Figure 2:
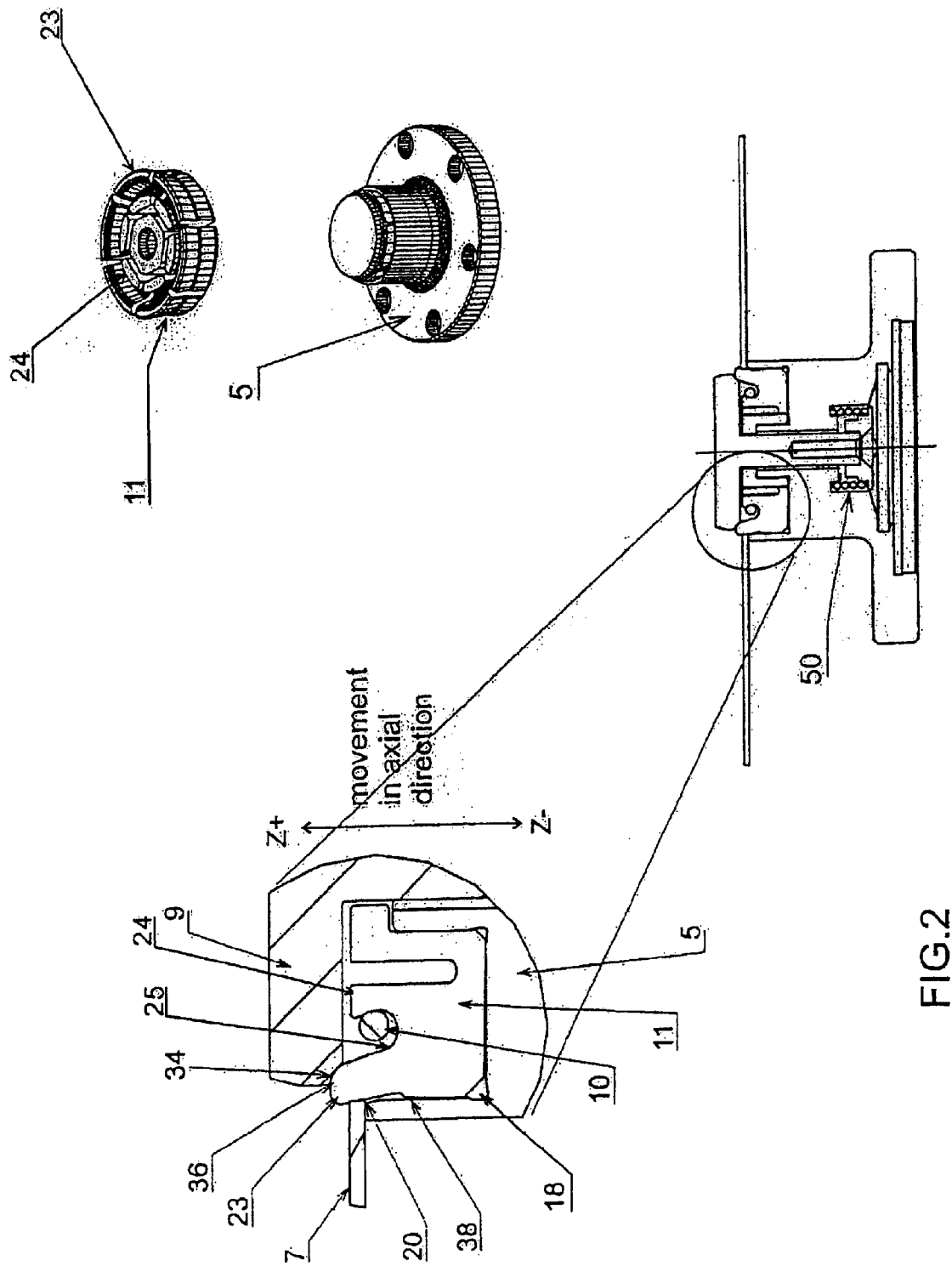
FIG. 2 is a detailed side sectional view of the inventive clamping apparatus in a disk-clamping position.

As better shown in FIG. 2 at least the outer border of the cap 9 having contacting surface with the rounded fingers 23 is conically-shaped to provide both axial and radial restraint of the disk. The cap 9 is arranged at the piston 2. Pneumatic or mechanical actuation of a piston 2 within the hub 5 is translated to the lock member 11 to cause movement from a disk-releasing position to a disk-clamping position. Downward movement of the piston 2 forces the conically-shaped outer border of the cap 9 against the rounded fingers 23 thereby causing an expansion of the outer fingers 23 until the outer fingers 23 reach a disk-clamping position in which the outer fingers press a disk against the disk-seating surface of the hub. A spring 13 is utilized to bias the lock member 11 via the piston 2 in the disk-clamping position.

FIG. 2 shows a detailed side sectional view of the inventive clamping apparatus in a disk-clamping position. By axial movement of the cap 9 in the z+ direction, the clamping surface formed by the cap 9 and the outer fingers 23 will be released and the outer fingers 23 of the lock member 11 will be retracted with support by the retracting force of the O-ring 10 until a disk-releasing position is reached.

By axial movement of the cap in the z-direction, the cap 9 especially the outer border of the cap 34 which is conically-shaped will come in contact with the outer fingers 23 of the lock member 11 caused by the retracting spring 13 arranged in the hub 5 resulting in an expansion of the outer diameter of the outer fingers 23 of the lock member 11. The pressure of the cap 9 against the outer fingers 23 of the lock member 11 causes an expansion of the outer fingers 23 until a disk-clamping position is reached in which the fingers 23 press a disk 7 against the disk-seating surface 20 of the hub 5 to restrain the disk 7 only in the lower axial direction. An significant advantage of this arrangement is that the position of the lock member 11 between disk-clamping as well as disk-releasing position remains unchanged due to clamping effect at stiffening area 38 between lock member 11 and recess 18. In addition, the stiffening area (38) of the lock member (11) has a greater diameter than an outer diameter of the recess (18). Furthermore, down movement of the cap 9 without having a disk introduced does not create contact of the outer fingers 23 against the disk-seating surface 20 of the hub 5. Unnecessary wear is therefore avoided.

Figure 3:
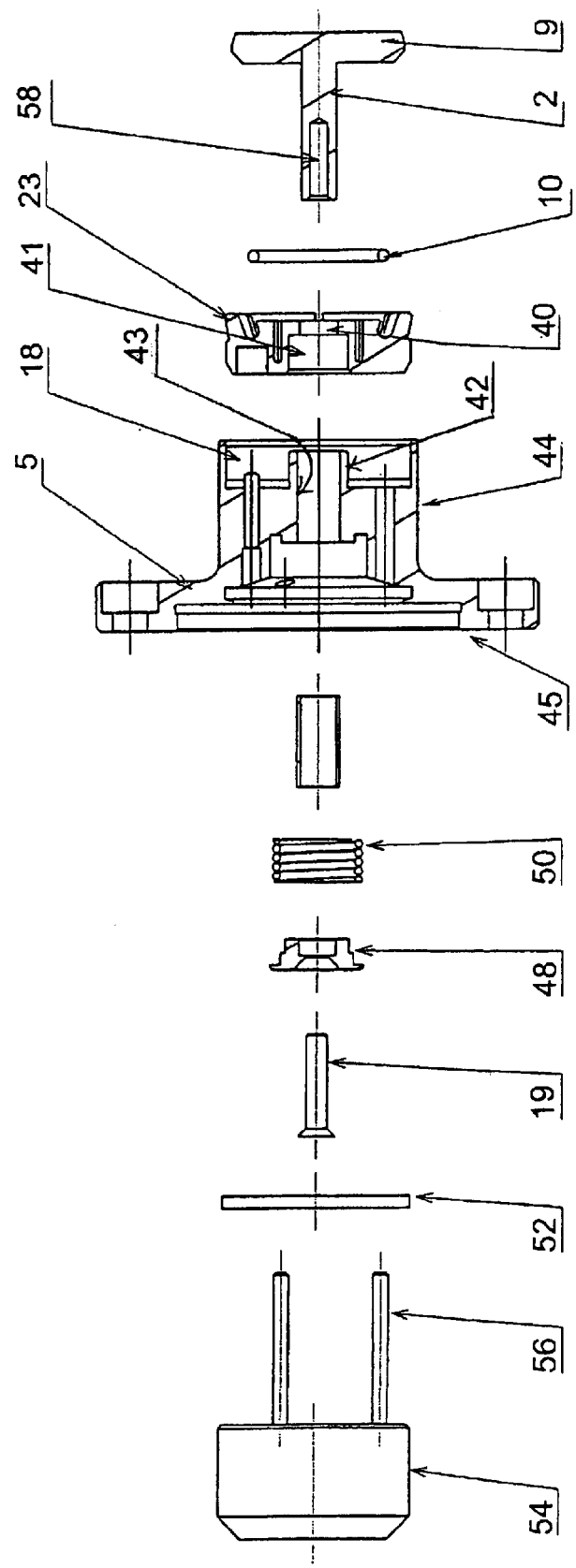
FIG. 3 is an exploited view of the inventive clamping apparatus.

FIG. 3 shows an exploded view of the inventive clamping apparatus. The cap 9 is arranged at a piston 2. The piston 2 contains a longitudinally-arranged bore 58 providing connection with the screw 19. The cap 9 and the piston 2 are preferably formed as a metallic integral part. As already discussed the outer border of the cap 9 having a contacting surface with the outer fingers 23 of the lock member 11 is conically-shaped 34 for providing precise contact with the outer fingers 23 being preferably rounded and inclined.

The piston 2 is guided in the bore 40 of the lock member 11 and the bore 43 of the hub 5. The lock member 11 having an axially-arranged aperture 41 forming a guide bearing for the guiding portion 42 of the hub 5 arranged within the recess 18. The lock member 11 is preferably made of an elastically flexible material. The slits in the lock member 11 may be eliminated to provide a continuous surface. In such case, the choice of material becomes more important since the lock member must be allowed to expand and retract. In any case the material must allow expansion as well a retraction of the outer fingers 23 at least in the upper area of the outer fingers 23 forming contacting surface with the cap 9 and the disk.

The lock member 11 will be arranged in the recess 18 of the hub 5. The hub 5 has an upper portion 44 containing the clamping apparatus, and a flange 45 for attaching the hub at a spindle. A spring bearing member 48 with a spring 50 having a certain initial stress is arranged in the hub 5 by attaching the spring member 48 by means of a screw 19 at the piston 2. The outer surface of the spring member is covered by a cover 52, e.g. Neoprene® cover. The lock member 11 may be removed of the recess 18 by using a removal member 54 having at least two pins 56.

The advantages of the present invention may be summarized as follows. The flexible lock member of the present invention is arranged in the recess of the hub without allowing an axial movement from the disk-releasing position to the disk-claiming position. This simplifies manufacturing as well as the maintenance of the clamping device. Furthermore, the clamping apparatus may be used in different positions, e.g. vertical or horizontal. A frusto-conical portion for causing an expansion of the lock member as suggested by all the prior art documents is not required. The clamping effect as suggested by the present invention is exclusively caused by axial force of the cap against the outer fingers of the lock member without using a conical wedge or load transfer member. This clearly simplifies the manufacturing and the assembly of the parts of the clamping device.

Furthermore, the present invention suggests a lock member having a segmentation defined by continuous vertical slits only. Vertical bores in the lock member as suggested by the prior art which are very costly and time consuming are not required. Finally, down movement of the cap without having a disk introduced does not create contact of the outer fingers against the disk-seating surface of the hub. Unnecessary wear is therefore avoided by the present invention.

What is claimed is:

1. A spindle clamp for removably supporting a disk having a central aperture, said spindle clamp comprising:

a hub having a rotational axis and a disk-seating surface, wherein said hub includes an axially-arranged recess; and a lock member having an axis generally coinciding with said rotational axis, wherein said lock member includes at least a flexible upper portion to allow expansion in a radial direction being exclusively caused by a force applied to a cap in an axial direction, and retracting in a base position when said force is removed, wherein said lock member is axially-arranged in said hub such that said upper portion of said lock member exceeds said disk-seating surface of said hub to provide both axial and radial restraint of said disk, wherein said cap provides a force to said upper portion of said lock member and further includes means for providing a force to said cap, wherein said cap is arranged at a piston, wherein said piston fits into a bore of said hub, and said cap and piston are released from said hub with an inserted removal member having a plurality of pins for pushing said cap and piston out of said hub.

2. The spindle clamp according to claim 1, wherein said hub comprises a cylindrical recess in which said lock member is axially-fixed, and a lower portion of said lock member remains in contact with said cylindrical recess while expanded and retracted.

3. The spindle clamp according to claim 2, wherein an outer surface of said recess forms a common border with said disk-seating surface, and said disk-seating surface only provides axial restraint of said disk.

4. The spindle clamp according to claim 1, wherein said hub contains a cylindrical guiding portion arranged in said recess.

5. The spindle clamp according to claim 1, wherein said lock member is a annular member having a plurality of axially-arranged fingers formed in a continuous configuration without slits.

6. The spindle clamp according to claim 5, wherein said fingers are spaced from adjacent outer fingers by narrow slits and said piston is free of contact with said locking member.

7. The spindle clamp according to claim 6, wherein said lock member comprises two rows of fingers, one outer row forms said outer fingers affecting clamping, and an inner row forms inner fingers supporting retraction of said outer fingers in their base position by using an O-ring, and wherein both rows of fingers and said O-ring are all axially aligned with each other such that said O-ring is located between both rows of fingers in an axial direction.

8. The spindle clamp according to claim 7, wherein said inner and outer row of fingers are separated by a groove that is axially aligned with both rows of fingers.

9. The spindle clamp according to claim 7, wherein an inner part of said inner row of fingers is hexagonally formed providing fixing positions for said fingers of said inner row.

10. The spindle according to claim 7, wherein said fingers of said inner and outer rows are radially assigned to each other.

11. The spindle according to claim 10, wherein each assigned pair of said inner and outer fingers have a common bending area.

12. The spindle according to claim 10, wherein said fingers of said outer row forming a contacting surface with said cap are greater than said fingers of said inner row.

13. The spindle according to claim 5, wherein said lock member comprises a lower outer finger portion having a stiffening area and an upper finger portion having a rounded surface at a contacting area with said cap.

14. The spindle according to claim 13, wherein said stiffening area of said lock member has a greater diameter than an outer diameter of said recess.

15. The spindle according to claim 1, wherein an outer border of said cap having contacting surface with a rounded surface of outer fingers of said lock member is a conically-shaped surface.

16. The spindle according to claim 1, wherein said means for providing force to said cap comprises a spring fitting around said piston against said hub, said spring engaging a washer secured to an end of said piston for providing force against said cap.

* * * * *